March 2, 1965  R. H. ASPINWALL  3,171,631
TURBINE BLADE

Filed Dec. 5, 1962  2 Sheets-Sheet 1

INVENTOR.
Robert H. Aspinwall
BY
Peter P. Kozak
ATTORNEY

March 2, 1965 R. H. ASPINWALL 3,171,631
TURBINE BLADE
Filed Dec. 5, 1962 2 Sheets-Sheet 2
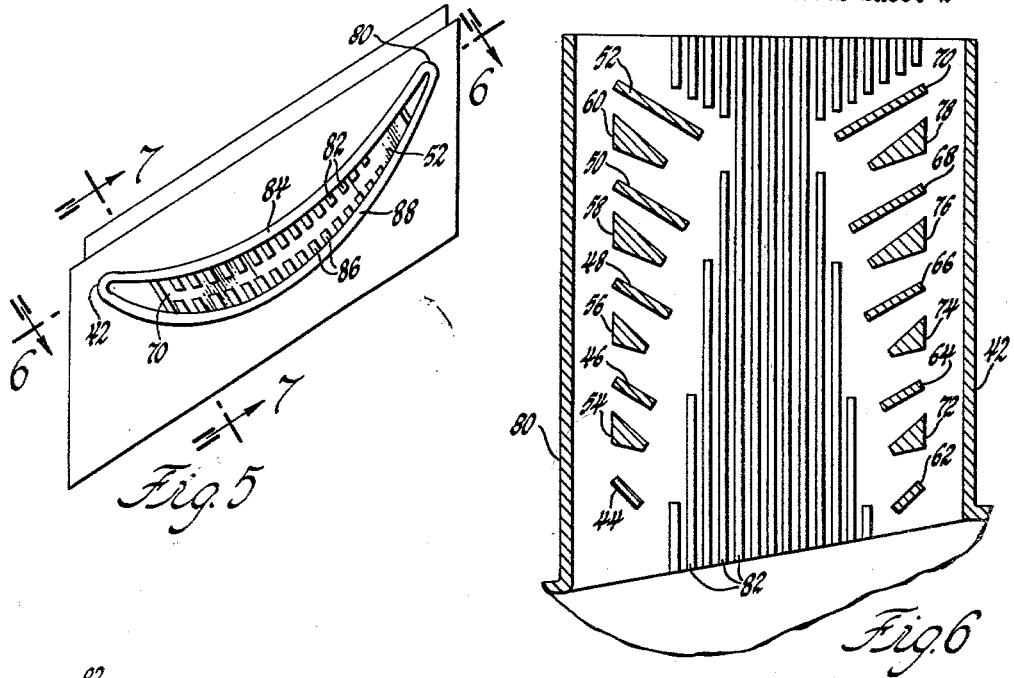
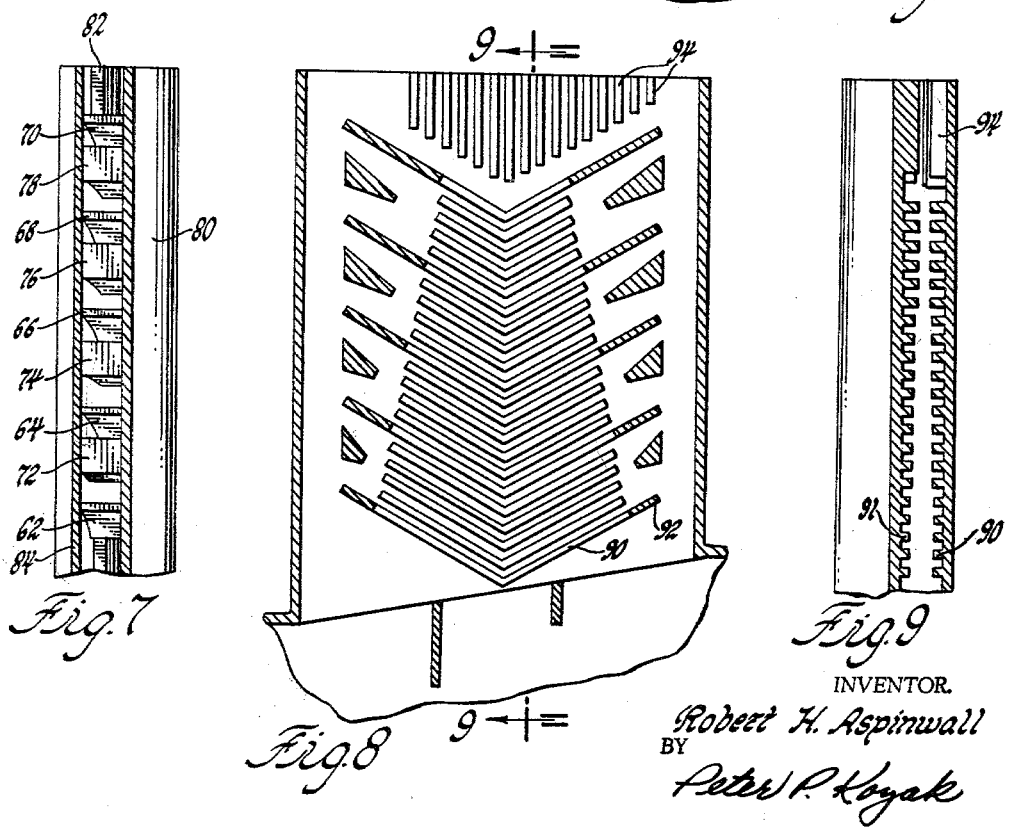
INVENTOR.
Robert H. Aspinwall
BY
Peter P. Kozak
ATTORNEY

ゐ

3,171,631
TURBINE BLADE
Robert H. Aspinwall, Indianapolis, Ind., assignor to General Motors Corporation, Detroit, Mich., a corporation of Delaware
Filed Dec. 5, 1962, Ser. No. 242,416
6 Claims. (Cl. 253—39.1)

This invention relates to hollow turbine blades, vanes and the like which have fluid passages therethrough to provide means for admitting cooling fluids through the blade during the operation of the engine in connection with which it is used and more particularly to an improved internal structure which provides a greater structural strength and cooling efficiency. Related subject matter is disclosed in the patent application Serial No. 34,792, Hamilton L. McCormick, filed June 8, 1960, now abandoned, and assigned to the assignee of the present invention.

In turbojet engines or the like a turbine operated by burning gases drives a blower which furnishes air to a burner. These turbines operate at high temperatures and accordingly the capacity of the engine is to a large extent limited by the ability of the metal of which the turbine blades are made to withstand the high operating temperatures. One method of increasing turbine blade operating temperatures of these engines involves the use of hollow blades and vanes and in passing a cooling fluid through them whereby these components are cooled.

It is the basic object of this invention to provide an improved turbine blade, vane or the like having improved cooling means and being capable of withstanding higher engine operating temperatures. It is a further object of this invention to provide a hollow turbine blade or the like having a plurality of internal vanes extending between the concave and convex foils of the blade to serve as pedestal or support members for strengthening the blade structure and which are positioned at angles with respect to the longitudinal axis of the blade whereby in operation of the blade the coolant fluid is passed into the hollow passage of the blade and is directed toward the leading and trailing edges thereof. A further object of the invention is to position some of the guide vanes within the blade at an angle with respect to other guide vanes in a manner such that a nozzle effect is created between vanes which increases the velocity of the coolant fluid flow toward the leading and trailing edges and raises the convection coefficient.

Figure 1:
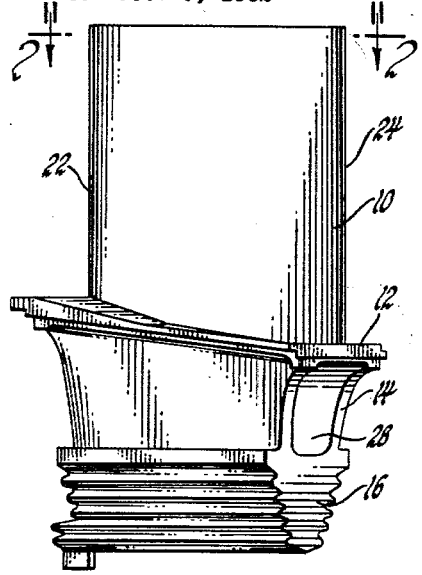
Figure 2:
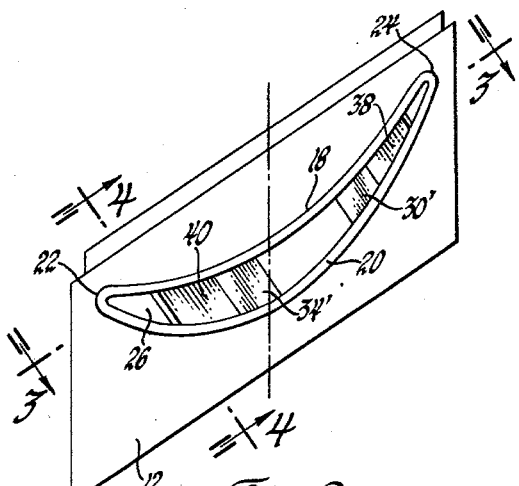
Figure 3:
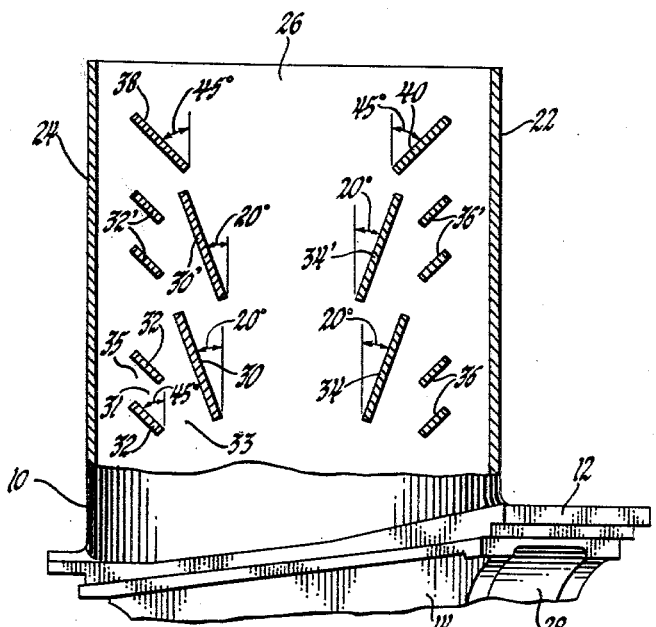
Figure 4:
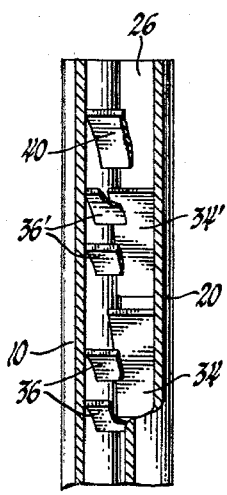

Other objects and advantages of the invention will be apparent from the following description, reference being had to the accompanying drawings, in which:

FIGURE 1 is an elevation view of a turbine blade;
FIGURE 2 is a plan view of the blade taken along line 2—2 of FIGURE 1 showing the internal blade structure;
FIGURE 3 is a cross-sectional view of the blade taken along line 3—3 of FIGURE 2;
FIGURE 4 is a fragmentary cross-sectional view with parts broken away taken along line 4—4 of FIGURE 2 showing the internal vane structure;
FIGURE 5 is an end view of a turbine blade showing another embodiment of the invention;
FIGURE 6 is a cross-sectional view taken along line 6—6 of FIGURE 5;
FIGURE 7 is a cross-sectional view taken along line 7—7 of FIGURE 5;
FIGURE 8 is an elevation cross-sectional view of a turbine blade depicting yet another embodiment of the invention; and
FIGURE 9 is a cross-sectional view taken along line 9—9 of FIGURE 8.

Experiments have shown that a hollow turbine blade structure which does not contain an internal vane structure producing a nozzle effect which directs coolant fluid toward the leading and trailing edges involves a substantially stagnant layer of coolant fluid therealong with the result that the leading and trailing edges of the blade operate at temperatures similar to those involved with a solid type blade so that the beneficial effect of cooling the central portions of the blade is lost due to a failure of the leading and trailing edges.

It has been found that merely increasing the flow of coolant through a hollow blade longitudinally thereof produces substantially no additional cooling on the leading and trailing edges. To accomplish a significant improved cooling it has been found necessary to direct coolant fluid at the leading and trailing edges in such a manner that these edges will be scrubbed, so to speak, by the coolant fluid flow. Ideally it is believed that an optimum effect would be obtained if the coolant fluid was directed at the leading and trailing edges at an angle substantially normal thereto. However, since the blade structure in which the coolant air is directed at a normal angle to these edges while moving the coolant air through the blade at a reasonable rate is difficult, if not impossible, to fabricate in the form of a cast blade, the present invention involves a compromise of providing support and nozzle producing vanes which direct the air at an angle of approximately 45 degrees with respect to the leading or trailing edge or more.

Referring now to the drawings, FIGURES 1 through 4 illustrate one embodiment of this invention which, for the sake of simplicity, is shown in terms of a turbine blade although it is to be understood that the principles of this invention may be applied to guide vanes and similar components of a turbine. As shown in FIGURE 1, the outer configuration of the blade is of more or less conventional design and includes an airfoil portion 10, a platform 12, a stalk or shaft portion 14, and a root portion 16. As is indicated in FIGURE 2, the airfoil portion 10 of the blade is hollow and has a concave wall portion 18 and a convex wall portion 20. These walls terminate in a leading edge 22 and a trailing edge 24. The walls 18 and 20 and the edges 22 and 24 of the blade surround an internal passageway system generally indicated by the numeral 26 which communicates directly with a transverse passage 28 passing through the stalk 14 of the blade.

A turbine blade which involves the portions above-enumerated tends to be relatively weak at high turbine operating temperatures due to the lack of supporting means between the concave and convex airfoil walls 18 and 20 and because in the normal operation of the engine the leading and trailing edges 22 and 24 respectively are inadequately cooled since the coolant fluid tends to rush out through the wider portions of the passage 26 with only minimal or no penetration to the leading and trailing edge portions thereof. An important feature of this invention is to provide guide vanes extending between the concave and convex walls 18 and 20 which provide pedestals or supports which prevent a collapse of the blade during operation and which are arranged so that a portion of the coolant fluid passing through the passage 28 and thence through the passage 26 of the blade will be directed or diverted outwardly against the leading edge 22 and the trailing edge 24 of the blade and further to arrange them so that the coolant fluid is subjected to a nozzle effect whereby the velocity of the coolant fluid flow is accelerated in the vicinity of the leading and trailing edges to raise the convection coefficient.

As shown in FIGURE 3, the guide vanes preferably include the relatively long segments 30 located generally along the longitudinal axis of the blade on the trailing edge side thereof which is angled in the direction of the leading edge to direct or divert the coolant fluid flow toward the leading edge and at least a pair of shorter guide vanes 32 positioned between the larger segment 30 and the trailing edge 24. The vanes extend from the concave to the convex walls of the blade and are preferably integrally formed therewith. The inner segments 32 are angled toward the trailing edge of the blade at a greater angle than the larger vane 30. It will be observed that the shorter segments 32 form a conduit 31 between them. Since, as shown in FIGURE 2, the thickness of the blade 10 diminishes toward the leading and trailing edges, the cross-sectional area or volume of the passage 31 between the segments 32 likewise is gradually reduced. The gradually decreasing volume of the passage 31 produces a nozzle effect which involves the conversion of pressure to velocity as is well known in the art. Experiments have shown that a satisfactory cooling effect is obtained when the ratio of the cross-sectional area of the inlet 33 to the outlet 35 is approximately 2:1. It will be understood, of course, that improved cooling effects may be obtained although the outlet 35 has a cross-sectional area less than twice but greater than the cross-sectional area of the outlet 35. Besides serving as a support between the concave and convex sides of the blade, the segment 30 serves as a vane or baffle to divert the flow of coolant fluid into the inlet 33 of the nozzle formed by the vanes 32. Preferably the vane 30 is positioned at an angle of approximately 20 degrees to the longitudinal axis of the blade and the vanes 32 are positioned at an angle of approximately 45 degrees to the longitudinal axis of the blade so that the coolant fluid is turned gradually from a radial path with respect to the turbine rotor to a chordal path toward the trailing edge 24 of the blade.

Although the vanes 32 are shown parallel to one another, it will be understood that these may be positioned at an angle to one another which has the effect of varying the ratio of the inlet 33 volume to the outlet 35 volume to obtain the desired nozzle effect. The angle of placement of the vanes 30 with respect to the vanes 32 may also be varied to obtain a desired effect.

Downstream of the groups of vanes 30 and 32 a similar subsequent group is positioned consisting of the larger vane 30', located along the longitudinal axis of the blade and aligned with the segment 30, and the shorter vanes 32'. This set of vanes is arranged and functions in a manner similar to the vane segments 30 and 32 as described above.

Similar larger vane segments 34 and 34' which are positioned at an angle of approximately 20 degrees with respect to the longitudinal axis of the airfoil on the trailing edge side of the blade and shorter vane segments 36 and 36' are coupled with the segments 34 and 34' respectively at an angle of approximately 45 degrees with respect to the longitudinal axis of the blade to direct the flow and increase the velocity of a portion of the coolant fluid stream toward the leading edge of the blade. Preferably somewhat longer segments 38 and 40 are positioned near the end of each set of vanes on each side of the blade preferably having an angle of approximately 45 degrees to the longitudinal axis of the blade to direct the coolant fluid to the leading and trailing edges respectively at the end of the blade.

The blade described may conveniently be made by the so-called "lost wax" process by the procedure described in the co-pending patent application Serial No. 34,792 mentioned above. Generally speaking, this process involves forming a ceramic core which has the configuration of the hollow portions 26 of the airfoil and the coolant fluid entry passage 28 through the stalk. A wax pattern is formed over this core which has an outer configuration of the turbine blade shown in FIGURE 1. This wax-covered pattern is invested. The refractory material of the investment is then fired whereby the wax is caused to flow or burn out and a mold is formed which includes a cavity having the outer configuration of the blade shown in FIGURE 1 and having the aforementioned core positioned therein. Molten metal is then cast in the cavity. Finally, the core which is preferably formed of a caustic leachable ceramic material is dissolved out to provide the completed turbine blade shown in FIGURES 1 through 4. The core may be readily formed of a material and by a procedure including apparatus described in the aforementioned co-pending patent application.

The embodiment of the invention shown in FIGURES 5 and 6 includes a series of coolant fluid directing and support vanes on each side of the blade for directing the coolant at an angle of at least 45 degress with respect to the leading and trailing edges thereof. To this end, with respect to the trailing edge 80, there is provided a series of guide vanes 44, 46, 48, 50 and 52 disposed at an angle of preferably 45 degrees to the trailing edge 80. Intermediate these guide vanes there is positioned a series of triangular vanes 54, 56, 58 and 60. As is apparent from an examination of the rectangular guide vanes 44 through 52 and the triangular vanes 54 through 60, a passage is produced between each triangular block such as 54 and adjacent rectangular vane 44 having the effect of a nozzle. The triangular configuration of the alternate blocks 54 through 60 varies the volume of the conduit or nozzle formed between it and the adjacent rectangular block to produce the desired inlet volume to outlet volume ratio as described above. The opposite side of the blade is provided with a similar series of angled rectangular vanes 62, 64, 66, 68 and 70 and a similar series of triangular vanes 72, 74, 76 and 78 in spaced relation which function in a similar manner with respect to the leading edge 42 of the blade. These vanes also serve as support members and form nozzles which change the coolant fluid flow from a radial to a chordal flow whereby the leading and trailing edges of the blade are scrubbed with the coolant air. It will be observed that each of the rectangular vanes 44 through 52 and the triangular vanes 54 through 60 gradually increase in length so as to produce a substantially equal cooling effect along the blade even though the volume of air decreases along the blade due to air being diverted toward the leading and trailing edges as the air passes through the blade. Preferably the central longitudinal portions of the blade are provided with a plurality of internal ribs 82 extending inwardly from the concave wall 84 and the internal ribs 86 extending inwardly from the convex wall 88 of the blade to serve as heat radiating elements.

FIGURES 8 and 9 show another embodiment which is similar to that of FIGURES 5 and 6 except that the internal heat radiating ribs 90 and 91 are positioned at the same angle to the longitudinal axis of the blade as the rectangular coolant directing vanes such as the rib 92. These ribs also assist in directing the coolant fluid from the central passage toward the leading and trailing edges of the blade. The end of the blade is provided with a series of ribs 94 which are parallel to the longitudinal axis of the blade to insure an adequate cooling of the blade tip. The longitudinal ribs in the design of FIGURES 5 and 6 promote the movement of a somewhat greater amount of cooling fluid through the central sections of the blade.

While the embodiments of the present invention as disclosed herein constitute preferred forms, it is to be understood that other forms may be adopted without departing from the spirit of the invention.

I claim:

1. A turbine blade or the like comprising a hollow airfoil structure including concave and convex walls and leading and trailing edges forming a first coolant passage therebetween longitudinally thereof and at least two elongated struts extending between said concave and convex walls, said struts defining a second passage therebetween having an intake end and an exhaust end, said exhaust end being inclined toward one of said edges whereby some of the coolant is directed on to said one edge, the intake end of said passage having a substantially greater cross-sectional area than said exhaust end whereby the coolant flowing through said passage is subjected to a nozzle effect and the coolant is caused to impinge upon said edge of the blade.

2. Claim 1 wherein said second passage is inclined at least about 45° to the longitudinal axis of the blade.

3. Claim 1 wherein said second passage is inclined at least about 45° to the longitudinal axis of the blade and the ratio of the cross-sectional area of said intake end to the cross-sectional area of said exhaust end is about 2 to 1.

4. A turbine blade or the like comprising a hollow airfoil structure including concave and convex walls and leading and trailing edges forming a first coolant passage therebetween longitudinally thereof, at least a first pair of elongated struts extending between said concave and convex walls located on the leading edge side of the blade, and at least a second pair of struts extending between said concave and convex walls located on the trailing edge side of the blade, said first pair of struts forming a second coolant passage therebetween having an intake end and an exhaust end and said second pair of struts forming a third passage therebetween having an intake end and an exhaust end, said exhaust end of said second passage being inclined toward the leading edge of the blade whereby some of the coolant is directed onto said leading edge and the exhaust end of said third passage being inclined toward the trailing edge of the blade whereby some of the coolant is directed onto said trailing edge, the intake ends of said second and third passages being of substantially greater cross-sectional area than the exhaust ends thereof whereby the coolant flowing through said second and third passages is subjected to a nozzle effect and the coolant is caused to impinge on said leading and trailing edges respectively.

5. A turbine blade or the like comprising a hollow airfoil structure including concave and convex walls and leading and trailing edges forming a first coolant passage therebetween longitudinally thereof, at least two elongated struts extending between said concave and convex walls and positioned between one of said edges of the blade and the longitudinal centerline of the blade, said struts defining a second passage therebetween having an intake end and an exhaust end, said exhaust end being inclined toward said one edge of the blade, the intake end of said passage having a substantially greater cross-section area than said exhaust end whereby the coolant flowing through said passage is subjected to a nozzle effect and is caused to impinge on said edge of the blade, and a third elongated strut positioned between said pair and the said longitudinal centerline of the blade and being inclined toward said one edge for diverting coolant flow from a longitudinal path in said first passage into the intake end of said second passage.

6. A turbine blade or the like comprising a hollow airfoil structure including concave and convex walls and leading and trailing edges forming a first coolant passage therebetween longitudinally thereof, at least a first pair of elongated struts extending between said concave and convex walls located on the leading edge side of the blade, at least a second pair of struts extending between said concave and convex walls located on the trailing edge side of the blade, said first pair of struts forming a second coolant passage therebetween having an intake end and an exhaust end and said second pair of struts forming a third passage therebetween having an intake end and an exhaust end, said exhaust end of said second passage being inclined toward the leading edge of the blade whereby some of the coolant is directed onto said leading edge and the exhaust end of said third passage being inclined toward the trailing edge of the blade whereby some of the coolant is directed onto said trailing edge, the intake ends of said second and third passages being of substantially greater cross-sectional area than the exhaust ends thereof whereby the coolant flowing through said second and third passages is subjected to a nozzle effect and the coolant is caused to impinge on said leading and trailing edges respectively, and coolant guide means attached to at least one of said airfoil walls disposed between said first and second pairs of struts for diverting some of the coolant in said first passage into each of the intake openings of said second and third passages.

References Cited in the file of this patent

UNITED STATES PATENTS

| | | |
|---|---|---|
| 2,644,665 | Cangemi | July 7, 1953 |
| 2,699,598 | Daugherty | Jan. 18, 1955 |
| 2,923,525 | Creek | Feb. 2, 1960 |
| 2,998,958 | Alford | Sept. 5, 1961 |
| 3,051,439 | Hilton | Aug. 28, 1962 |